United States Patent
Janakiraman et al.

(10) Patent No.: US 8,982,842 B2
(45) Date of Patent: Mar. 17, 2015

(54) MONITORING 3G/4G HANDOVERS IN TELECOMMUNICATION NETWORKS

(71) Applicant: Tektronix, Inc., Beaverton, OR (US)

(72) Inventors: Vignesh Janakiraman, Plano, TX (US); John P. Curtin, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 181 days.

(21) Appl. No.: 13/679,750

(22) Filed: Nov. 16, 2012

(65) Prior Publication Data

US 2014/0140321 A1    May 22, 2014

(51) Int. Cl.
*H04W 4/00*    (2009.01)
*H04W 24/02*    (2009.01)
*H04W 24/08*    (2009.01)
*H04L 29/06*    (2006.01)
*H04W 36/00*    (2009.01)
*H04W 76/04*    (2009.01)

(52) U.S. Cl.
CPC .............. *H04W 24/02* (2013.01); *H04W 24/08* (2013.01); *H04W 36/0033* (2013.01); *H04W 76/041* (2013.01); *H04L 69/08* (2013.01)
USPC ........................................................ 370/331

(58) Field of Classification Search
CPC . H04W 24/02; H04W 36/18; H04W 36/0011; H04W 36/08; H04W 84/12; H04W 88/08; H04W 88/06; H04W 76/022; H04W 76/02; H04W 76/041; H04W 24/08; H04W 36/0033; H04L 69/08
USPC ......... 370/252, 310, 315, 328, 329, 330, 331, 370/338, 431, 437, 464, 465, 470, 471
See application file for complete search history.

(56) References Cited

U.S. PATENT DOCUMENTS

| | | | | |
|---|---|---|---|---|
| 7,283,497 | B2 * | 10/2007 | Mueller | 370/331 |
| 7,551,585 | B2 * | 6/2009 | Foti et al. | 370/331 |
| 7,974,621 | B2 * | 7/2011 | Zhou et al. | 455/432.2 |
| 8,059,679 | B2 * | 11/2011 | Hu et al. | 370/466 |
| 8,358,577 | B1 * | 1/2013 | Khanka et al. | 370/221 |
| 2002/0150062 | A1 * | 10/2002 | Zheng et al. | 370/331 |
| 2012/0076120 | A1 * | 3/2012 | Kovvali et al. | 370/338 |
| 2014/0075538 | A1 * | 3/2014 | IM et al. | 726/13 |

OTHER PUBLICATIONS

English Translation of CN101541056 (Google Patents)—https://www.google.com/patents/CN101541056B?cl=en&dq=cn1015410 56&hl=en&sa=X&ei=sZbJU6qBKlfLsASYz4KwCw&ved=0CB 4Q6AEwAA.*

* cited by examiner

*Primary Examiner* — Kwang B Yao
*Assistant Examiner* — Ricardo Castaneyra
(74) *Attorney, Agent, or Firm* — Locke Lord LLP; Scott D. Wofsy; Christopher J. Capelli

(57) ABSTRACT

Systems and methods for monitoring 3G/4G handovers in telecommunication networks are described. In some embodiments, a method may include receiving a plurality of packets at a telecommunications monitoring system, the plurality of packets including a first packet following a first version of a protocol and a second packet following a second version of the protocol. The method may also include determining, via the a telecommunications monitoring system, that the first packet belongs to a first communication session that is correlated with a second communication session to which the second packet belongs. The method may further include using the telecommunications monitoring system to associate the first packet with the second packet in response to the determination.

14 Claims, 8 Drawing Sheets

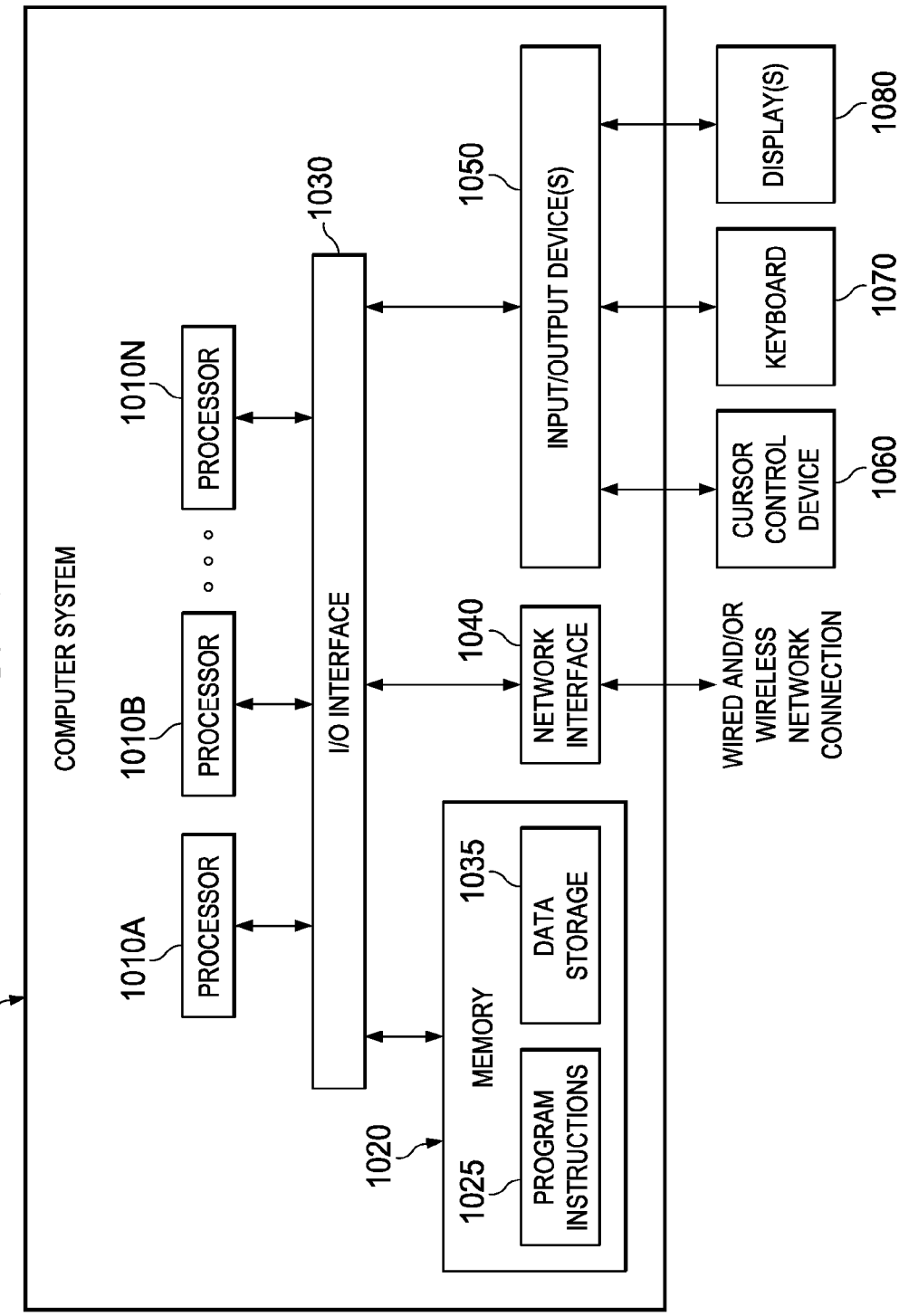

MONITORING 3G/4G HANDOVERS IN TELECOMMUNICATION NETWORKS

BACKGROUND

Mobile data networks continue to experience an unprecedented explosion in total traffic, particularly as new types of client devices (e.g., web-enabled smart phones, tablet devices, Internet-enabled TVs, gaming consoles, etc.) consume large amounts of bandwidth. Nowadays, data speeds of network traffic can be as high as 100 Gigabit/second (Gb/s). Thus, to remain competitive, network operators may employ network monitoring solutions configured to monitor services, performance, customer experience, equipment issues, etc. These network monitoring solutions typically have two components. First, one or more entities known as "probes" receive network data and perform analysis and/or correlation of that entire data. Then, a server (or a cluster of servers) aggregates the processed data and presents it to end-users.

SUMMARY

Embodiments of systems and methods for monitoring 3G/4G handovers in telecommunication networks are described herein. In an illustrative, non-limiting embodiment, a method may include receiving a plurality of packets at a telecommunications monitoring system, the plurality of packets including a first packet following a first version of a protocol and a second packet following a second version of the protocol, determining, via the a telecommunications monitoring system, that the first packet belongs to a first communication session that is correlated with a second communication session to which the second packet belongs, and using the telecommunications monitoring system to associate the first packet with the second packet in response to the determination.

For example, the protocol may be a General Packet Radio Service (GPRS) Tunneling Protocol (GTP), the first packet may follow a GTPv1 protocol, and the second packet may follow a GTPv2 protocol.

In some implementations, the second packet may be received after the first packet in connection with a 3G-to-4G handover. The method may include matching uplink control plane (CP) and user plane (UP) information for the first packet obtained from a Gn interface against uplink CP and UP information for the second packet obtained from an S5 or S8 interface. In some cases, the uplink CP information may be a first Tunnel Endpoint Identifier (TEId) and Internet Protocol (IP) address combination, and the uplink UP information may be a second TEId and IP address combination different from the first combination. The method may also include matching uplink CP information for the first packet obtained from a Gn interface against Fully Qualified Tunnel Endpoint Identifier (F-TEId) information for the second packet obtained from an S11 interface.

In other implementations, the first packet may be received after the second packet in connection with a 4G-to-3G handover. The method may include matching uplink CP and UP information for the second packet obtained from an S5 or S8 interface against uplink CP and UP information for the first packet obtained from a Gn interface. In some cases, the uplink CP information may be a first TEId and IP address combination, and the uplink UP information may be a second TEId and IP address combination different from the first combination. The method may also include matching F-TEId information for the second packet obtained from an S5 or S8 interface against uplink CP information for the first packet obtained from a Gn interface.

In another illustrative, non-limiting embodiment, a telecommunications monitoring system may include a processor and a memory coupled to the processor, the memory configured to store program instructions executable by the processor to cause the telecommunications monitoring system to receive a plurality of packets, the plurality of packets including a first packet following a first version of a protocol and a second packet following a second version of the protocol, determine that the first packet belongs to a first communication session that is correlated with a second communication session to which the second packet belongs, and associate the first packet with the second packet in response to the determination.

Again, as an example, the protocol may be a GTP protocol, the first packet may follow a GTPv1 protocol, and the second packet may follow a GTPv2 protocol.

In some implementations, the second packet may be received after the first packet in connection with a 3G-to-4G handover, and the program instructions may be further executable by the processor to cause the telecommunications monitoring system to match uplink CP and UP information for the first packet obtained from a Gn interface against uplink CP and UP information for the second packet obtained from an S5 or S8 interface, where the uplink CP information is a first TEId and IP address combination, and where the uplink UP information is a second TEId and IP address combination different from the first combination.

In other implementations, the second packet may be received after the first packet in connection with a 3G-to-4G handover, and the program instructions may be further executable by the processor to cause the telecommunications monitoring system to match uplink CP information for the first packet obtained from a Gn interface against F-TEId information for the second packet obtained from an S11 interface.

In yet other implementations, the first packet may be received after the second packet in connection with a 4G-to-3G handover, and the program instructions may be further executable by the processor to cause the telecommunications monitoring system to match uplink CP and UP information for the second packet obtained from an S5 or S8 interface against uplink CP and UP information for the first packet obtained from a Gn interface, where the uplink CP information is a first TEId and IP address combination, and where the uplink UP information is a second TEId and IP address combination different from the first combination.

In still other implementations, the first packet may be received after the second packet in connection with a 4G-to-3G handover, and the program instructions may be further executable by the processor to cause the telecommunications monitoring system to match F-TEId information for the second packet obtained from an S5 or S8 interface against uplink CP information for the first packet obtained from a Gn interface.

In yet another illustrative, non-limiting embodiment, a non-transitory computer-readable storage medium having program instructions stored thereon that, upon execution by a processor within a computer system, cause the computer system to receive a plurality of packets, the plurality of packets including a first packet following a first version of a protocol and a second packet following a second version of the protocol, determine that the first packet belongs to a first communication session that is correlated with a second communication session to which the second packet belongs, and associate the first packet with the second packet in response to the determination.

In some embodiments, one or more of the techniques described herein may be performed by one or more network monitoring systems. In other embodiments, a tangible computer-readable storage medium may have program instructions stored thereon that, upon execution by one or more network monitoring systems, cause the one or more network monitoring systems to perform one or more operations disclosed herein. In yet other embodiments, a system may include at least one processor and a memory coupled to the at least one processor, the memory configured to store program instructions executable by the at least one processor to cause one or more network monitoring systems to perform one or more operations disclosed herein.

BRIEF DESCRIPTION OF THE DRAWINGS

Reference will now be made to the accompanying drawings, where:

FIG. 10 is a block diagram of a computer system configured to implement various systems and methods described herein according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
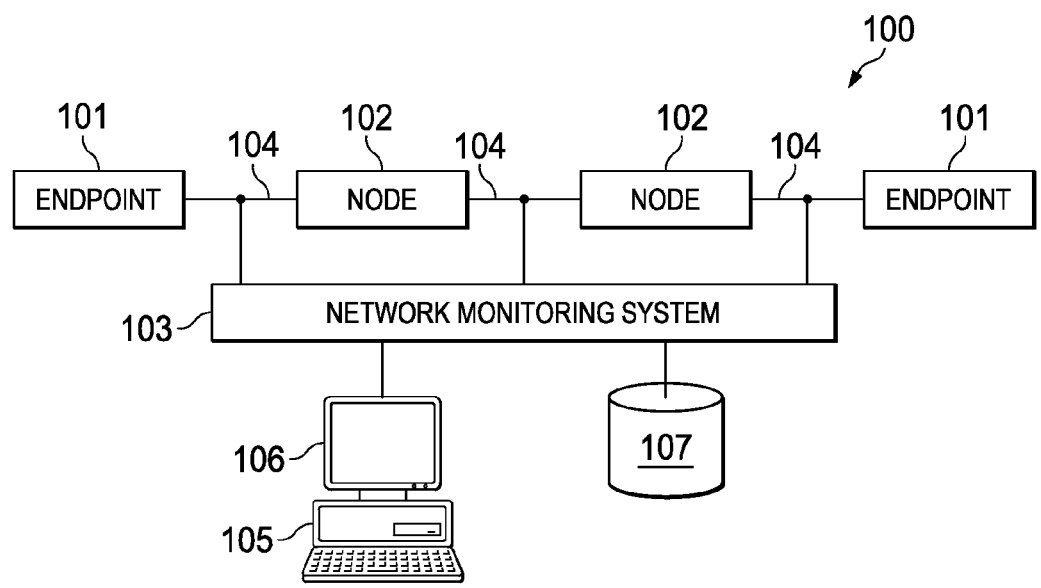
FIG. 1 is a block diagram of a network monitoring environment according to some embodiments.

FIG. 1 illustrates a block diagram of a network monitoring environment according to some embodiments. Particularly, telecommunications network 100 includes network nodes 102 and endpoints 101. For example, network 100 may include a wireless broadband network, a 3G network, a 4G network, a 3GPP Long Term Evolution (LTE) network, a voice-over-IP (VoIP) network, an IP Multimedia Subsystem (IMS) network, etc. Although only two nodes 102 and two endpoints 102 are shown in FIG. 1, it will be understood that network 100 may comprise any number of nodes 102 and endpoints 101. Moreover, it will be understood that the nodes 102 and endpoints 101 in network 100 may be interconnected in any suitable manner, including being coupled to one or more other nodes 102 and/or endpoints 101.

In some implementations, endpoints 101 may represent, for example, computers, mobile devices, user equipment (UE), client applications, server applications, or the like. Meanwhile, nodes 102 may be components in an intranet, Internet, or public data network, such as a router or gateway. Nodes 102 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints 101. Examples of these, and other elements, are discussed in more detail below with respect to FIG. 4.

Still referring to FIG. 1, many packets traverse links 104 and nodes 102, as data is exchanged between endpoints 101. These packets may represent many different sessions and protocols. For example, if endpoint 101 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If endpoint 101 is used to send or retrieve email, device 102 may exchange Internet Message Access Protocol (IMAP), Post Office Protocol 3 Protocol (POP3), or Simple Mail Transfer Protocol (SMTP) messages with an email server (i.e., the other endpoint 101). If endpoint 101 is used to download or stream video, device 101 may use Real Time Streaming Protocol (RTSP) to establish and control media sessions with a video server (i.e., the other endpoint 101). Alternatively, the user at endpoint 101 may access a number of websites using Hypertext Transfer Protocol (HTTP) to exchange data packets with a web server (i.e., the other endpoint 101). In some cases, communications may be had using the GPRS Tunneling Protocol (GTP). It will be understood that packets exchanged between devices 101 may conform to numerous other protocols now known or later developed.

Network monitoring system 103 may be used to monitor the performance of network 100. Particularly, monitoring system 103 captures packets that are transported across links or interfaces 104 between nodes 102, endpoints 101, and/or any other network links or connections (not shown). In some embodiments, packet capture devices may be non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations.

Monitoring system 103 may include one or more processors running one or more software applications that collect, correlate and/or analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. In some embodiments, these operations may be provided, for example, by the IRIS® toolset available from Tektronix, Inc., although other suitable tools may exist or be later developed. The packet capture devices coupling network monitoring system 103 to links 104 may be high-speed, high-density 10GE probes that are optimized to handle high bandwidth IP traffic, such as the GEOPROBE® G10, also available from Tektronix, Inc., although other suitable tools may exist or be later developed. A service provider or network operator may access data from monitoring system 103 via user interface station 105 having a display or graphical user interface 106, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 103 may further comprise internal or external memory 107 for storing captured data packets, user session data, and configuration information. Monitoring system 103 may capture and correlate the packets associated specific data sessions on links 104. In some embodiments, related packets can be correlated and combined into a record for a particular flow, session or call on network 100. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 103 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 103 may be capable of identifying certain information about each user's experience, as described in more detail below. A service provider may use this information, for instance, to adjust network services available to endpoints 101 such as the bandwidth assigned to each user, and the routing of data packets through network 100.

As the capability of network 100 increases toward 10GE and beyond (e.g., 100GE), each link 104 may support more users' flows and sessions. Thus, in some embodiments, link 104 may be a 10GE or a collection of 10GE links (e.g., one or more 100GE links) supporting thousands or tens of thousands of users or subscribers. Many of the subscribers may have multiple active sessions, which may result in an astronomical number of active flows on link 104 at any time where each flow includes many packets.

Figure 2:
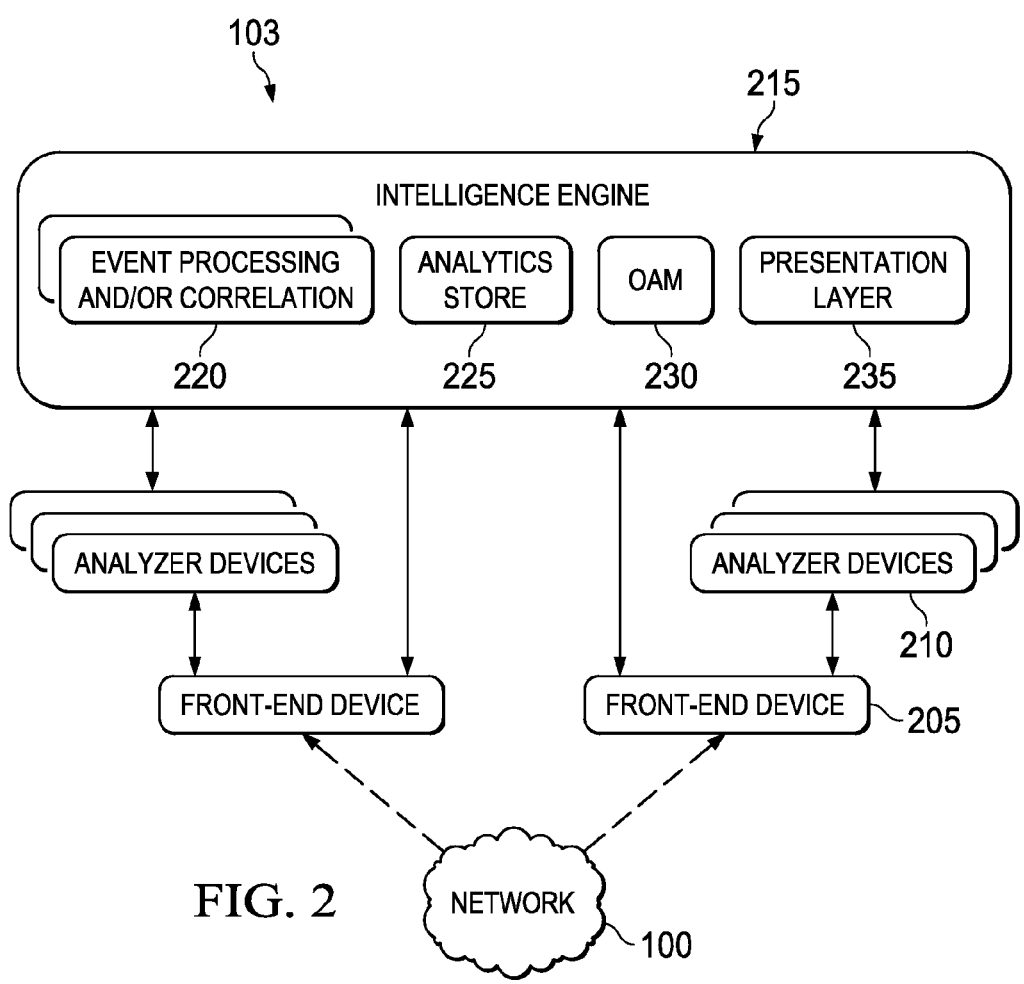
FIG. 2 is a block diagram of a hierarchical network monitoring system according to some embodiments.

Turning to FIG. 2, an example of network monitoring system 103 is illustrated according to some embodiments. As shown, one or more front-end monitoring devices or probes 205 (i.e., a first tier of a three-tiered architecture) may be coupled to network 100. Each of front-end devices 205 may also be coupled to one or more network analyzer devices 210 (i.e., a second tier), which in turn may be coupled to intelligence engine 215 (i.e., a third tier). Front-end devices 205 may also be directly coupled to intelligence engine 215, as described in more detail below. Typically, front-end devices 205 may be capable or configured to process data at rates that are higher (e.g., about 10 or 100 times) than analyzers 210. Although the system of FIG. 2 is shown as a three-tier architecture, it should be understood by a person of ordinary skill in the art in light of this disclosure that the principles and techniques discussed herein may be extended to a smaller or larger number of tiers (e.g., a single-tiered architecture, a four-tiered architecture, etc.).

Generally speaking, front-end devices 205 may passively tap into network 100 and monitor all or substantially of its data. For example, such one or more of front-end devices 205 may be coupled to one or more links 104 of network 100 shown in FIG. 1. Meanwhile, analyzer devices 210 may receive and analyze a subset of the traffic that is of interest, as defined by one or more rules. Intelligence engine 215 may include a plurality of distributed components configured to perform further analysis and presentation of data to users. For example, intelligence engine may include Event Processing and/or Correlation (EPC) 220; analytics store 225; Operation, Administration, and Maintenance (OAM) module 230; and presentation layer 235.

In some embodiments, front-end devices 205 may be configured to monitor all of the network traffic that it is tapped into (e.g., 10GE, 100GE, etc.). Front-end devices 205 may also be configured to intelligently distribute traffic based on a user session level. Additionally or alternatively, front-end devices 205 may distribute traffic based on a transport layer level. In some cases, each device 205 may analyze traffic intelligently to distinguish high-value traffic from low-value traffic based on a set of heuristics. Examples of such heuristics may include, but are not limited to, IMEI (International Mobile Equipment Identifier) TAC code (Type Allocation Code) and SVN (Software Version Number) as well as UAProf (User Agent Profile) and UA (User Agent), a customer list (e.g., mobile subscriber identifiers (IMSI), phone numbers, etc.), traffic content, or any combination thereof. Therefore, in some implementations, front-end devices 205 may feed higher-valued traffic to a more sophisticated one of analyzers 210 and lower-valued traffic to a less sophisticated one of analyzers 210 (to provide at least some rudimentary information).

Front-end devices 205 may also be configured to aggregate data to enable backhauling, to generate netflows and basic KPI calculations, time stamping of data, port stamping of data, filtering out unwanted data, protocol classification, and deep packet inspection (DPI) analysis. In addition, front-end devices 205 may be configured to distribute data to the back-end monitoring tools (e.g., analyzers 210 and/or intelligence engine 215) in a variety of ways, which may include flow based or user session based balancing. Devices 205 may also receive dynamic load information (e.g., namely CPU and memory utilization) from each of analyzer devices 210 so to enable intelligent distribution of data.

Analyzer devices 210 may be configured to passively monitor a subset of the traffic that has been forwarded to it by the front-end device(s) 205. Analyzer devices 210 may also be configured to perform stateful analysis of data, extraction of key parameters for call correlation and generation of call data records (CDRs), application specific processing, computation of application specific KPIs, and communication with intelligence engine 215 for retrieval of KPIs (e.g., in real-time and/or historical mode). In addition, analyzer devices 210 may be configured to notify front-end device(s) 205 regarding its CPU and/or memory utilization so that front-end device(s) 205 can utilize this information to intelligently distribute traffic.

Intelligence engine 215 may follow a distributed and scalable architecture. In some embodiments, EPC module 220 may receive events and may correlate information from front-end and analyzer devices 205 and 210, respectively. OAM module 230 may be used to configure and/or control front-end device 205 and analyzer devices 210, distribute software or firmware upgrades, etc. Presentation layer 235 may be configured to present event and other relevant information to the end-users. Analytics store 225 may include a storage or database for the storage of analytics data or the like.

In some implementations, analyzer devices 210 and/or intelligence engine 215 may be hosted at an offsite location (i.e., at a different physical location remote from front-end devices 205). Additionally or alternatively, analyzer devices 210 and/or intelligence engine 215 may be hosted in a cloud environment.

Figure 3:
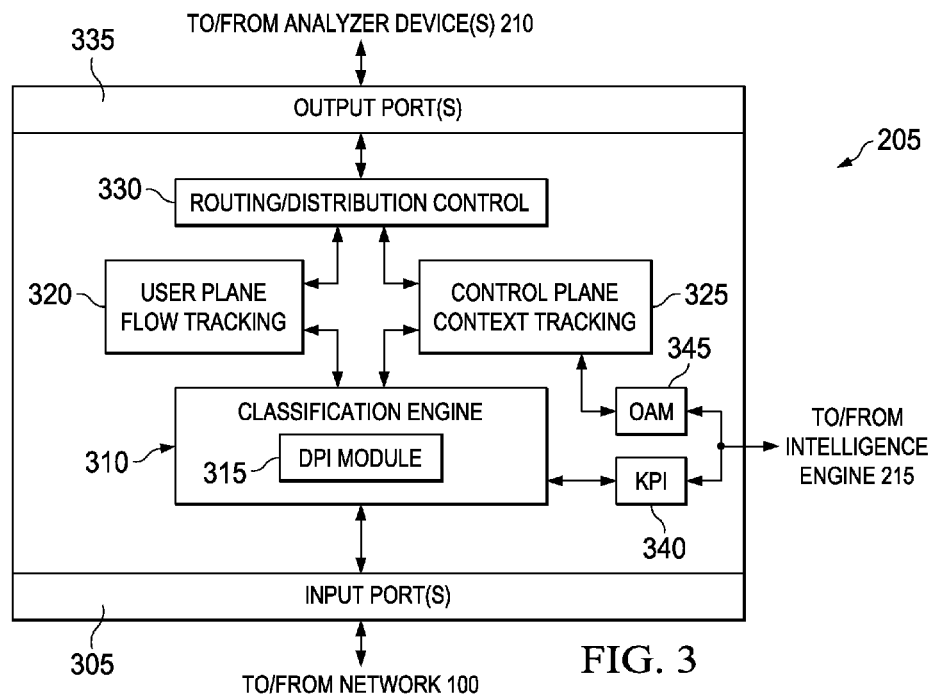
FIG. 3 is a block diagram of a monitoring probe according to some embodiments.

FIG. 3 is a block diagram of an example of front-end monitoring probe 205 according to some embodiments. Input port(s) 305 (e.g., 8, 40, or 100 Gb/s) may be coupled to network 100 and to classification engine 310, which may include DPI module 315. Classification engine 310 may be coupled to user plane (UP) flow tracking module 320 and to control plane (CP) context tracking module 325, which may be coupled to routing/distribution control engine 330. Routing engine 330 may be coupled to output port(s), which in turn may be coupled to one or more analyzer devices 210. In some embodiments, KPI module 340 and OAM module 345 may also be coupled to classification engine 310 and/or tracking modules 320/325, as well as to intelligence engine 215.

In some implementations, front-end probe or device 205 may be configured to receive traffic from network 100, for example, at a given data rate (e.g., 10 Gb/s, 100 Gb/s, etc.), and to transmit selected portions of that traffic to one or more analyzers 210, for example, at a different data rate. Classification engine 310 may identify user sessions, types of content, transport protocols, etc. (e.g., using DPI module 315) and transfer UP packets to flow tracking module 320 and CP packets to context tracking module 325. In some cases, classification engine 310 may implement one or more rules to allow it to distinguish high-value traffic from low-value traffic and to label processed packets accordingly. Routing/distribution control engine 330 may implement one or more load balancing or distribution operations, for example, to transfer high-value traffic to a first analyzer and low-value traffic to a second analyzer. Moreover, KPI module 340 may perform basic KPI operations to obtain metrics such as, for example, bandwidth statistics (e.g., per port), physical frame/packet errors, protocol distribution, etc.

OAM module 345 of front-end device 205 may be coupled to OAM module 230 of intelligence engine 215 and may receive control and administration commands, such as, for example, rules that allow classification engine 310 to identify particular types of traffic. For example, based on these rules, classification engine 310 may be configured to identify and/or parse traffic by user session (e.g., IMEI, IP address, phone number, etc.). In some cases, classification engine 310 may be session context aware (e.g., web browsing, protocol specific, etc.). Further, front-end device 205 may be SCTP connection aware to ensure, for example, that all packets from a same connection are routed to the same one of analyzers 210.

In various embodiments, blocks 305-345 may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Figure 4:
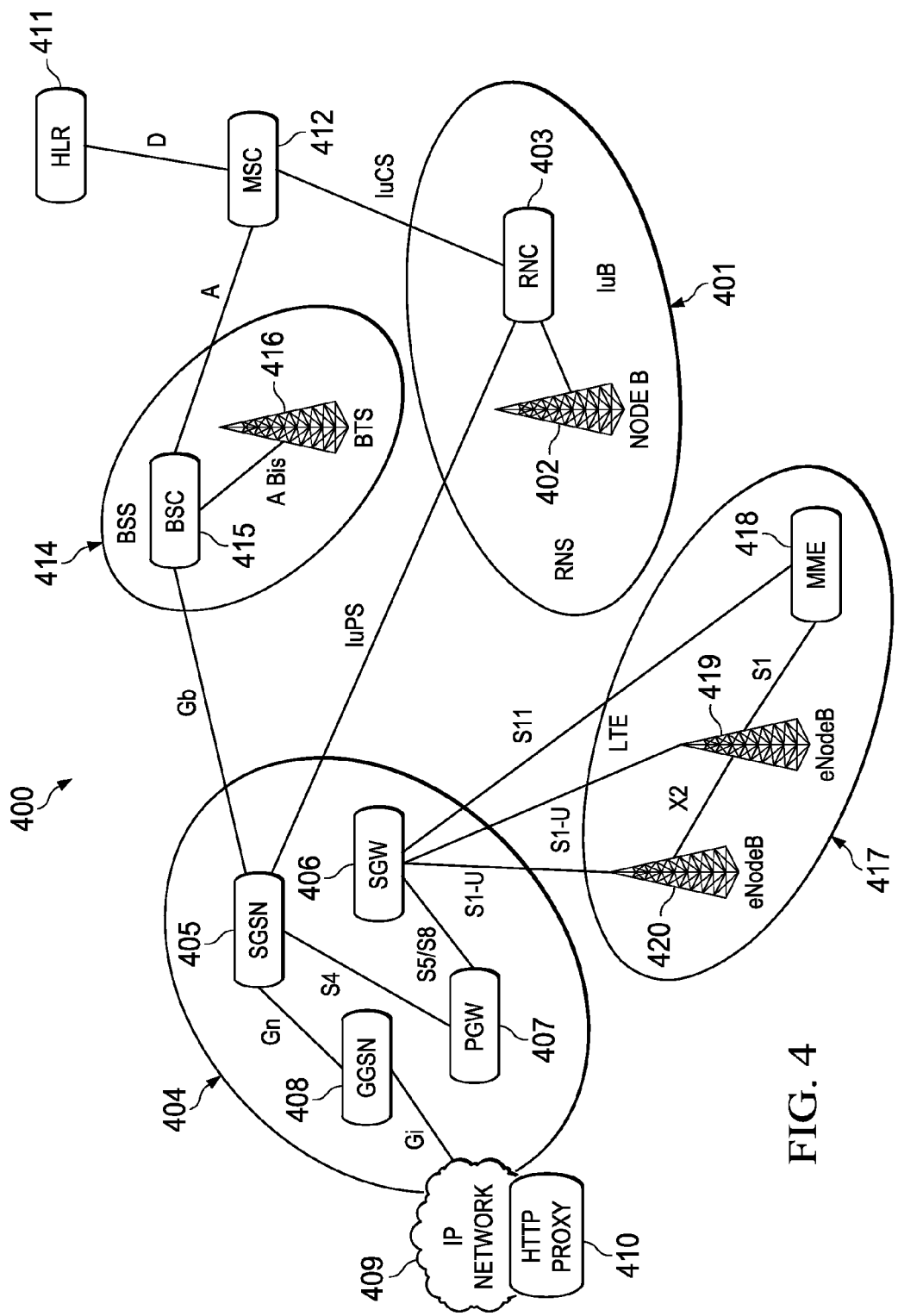
FIG. 4 is a block diagram of a 3rd Generation Partnership Project (3GPP) Mobile Radio Network including Global System for Mobile Communications (GSM), Universal Mobile Telecommunications System (UMTS), and Long Term Evolution (LTE) technologies where a monitoring probe may be deployed according to some embodiments.

FIG. 4 is a block diagram of a 3GPP Mobile Radio Network 400 including GSM, UMTS, and LTE technologies where a monitoring probe (e.g., front-end monitoring probe 205 in FIG. 2) may be deployed, according to some embodiments. As illustrated, core portion 404 may include SGSN 405 coupled to GGSN 408 via a Gn interface, and Serving Gateway (SGW) 406 coupled to Packet Data Network (PDN) Gateway (PDW) 407 via an S5 and/or S8 interface. Also, one or more elements within core network portion 404 may be coupled to IP network 409 and/or HTTP Proxy 410, for example, via a Gi interface. In some embodiments, a Gp interface between two mobile operators networks may also be used (not shown). Meanwhile, LTE/SAE access portion 417 may include one or more Evolved Node Bs (eNodeBs) 419 and 420 coupled to each other via an X2 interface, as well as Mobility Management Entity (MME) 418 coupled to eNodeBs 419 and/or 420 via an S1-MME interface. Moreover, eNodeBs 419 and 420 are coupled to SGW 406 via S1-U interfaces.

A GSM access portion may include Radio Network Subsystem (RNS) 401 having NodeB 402 coupled to Radio Network Controller (RNC) 403 via an Iub interface, which in turn is coupled to SGSN 405 via an Iu-PS interface. Base Station Subsystem (BSS) 414 may include Base Station Transceiver (BTS) 416 coupled to Base Station Controller (BSC) via an Abis interface, and BSC 415 may be coupled to SGSN 405 via a Gb interface. SGSN 405 is coupled to PGW 407 via an S4 interface. BSC 415 may be coupled to Mobile Switching Center (MSC) 412 via an A interface, and RNC 403 may be coupled to MSC 412 via an Iu-CS interface. Finally, MSC 412 may be coupled to Home Location Register (HLR) 411 via a D interface.

Still referring to FIG. 4, network 400 serves to illustrate various illustrative ways in which monitoring system 103 of FIG. 1 may be coupled to a telecommunications network in order to provide various systems and methods for identifying communication devices in telecommunication networks as described herein. For example, in some cases, monitoring system 103 may be coupled to Gn or Gp interface(s). Additionally or alternatively, monitoring system 103 may be coupled to S5/S8 interface(s). Additionally or alternatively, monitoring system 103 may be coupled to S1 and/or S11 interface(s).

Although FIG. 4 shows a 3GPP Mobile Radio Network 400 including GSM, UMTS, and LTE technologies, it should be noted that network 400 is provided as an example only. As a person of ordinary skill in the art will readily recognize in light of this disclosure, maybe of the techniques described herein may be equally applicable to other types of networks including other types of technologies (e.g., CDMA, CDMA 2G, EVDO 3G etc.). For example, in the context of CDMA technologies, voice call information may be intercepted (e.g., passively probed) between MSC and BSC nodes on an A1 interface. Roaming information may be intercepted between MSC and HLR on a C interface, between HLR and Visitor Location Register (VLR) on a D interface. Also, short message (SMS) information may be intercepted between MSC and Short Message Service Center (SMSC) on a Q interface. In the case of 2G Data (e.g., CDMAone), information may be intercepted between BSC and MSC on an A3/A5 interfaces. In the case of 2.5G/3G Data (e.g., CDMA2000 either 1×RTT or EVDO), information may be intercepted between BSC and IP Switch on an A10/A11 interfaces. Furthermore, authentication information may be intercepted between an Authentication, Authorization and Accounting (AAA) server and an IP router as Remote Authentication Dial In User Service (RADIUS) over User Datagram Protocol (UDP).

Generally speaking, a mobile device may communicate within network 400 using a first protocol, and subsequently communicate using a second protocol (e.g., as two different sessions). For instance, in some cases, a device may initiate communications using a first version of a given protocol (e.g., GTPv1 or "3G"), and then switch to a second version of the same protocol (e.g., GTPv2 or "4G"), or vice versa (e.g., GTPv2 or "4G" to GTPv1 or "3G"). To an external network monitoring system (e.g., system 103), being able to identify which interface(s) should be monitored, as well as which data and/or metadata should be used and/or created in order to correlate the seemingly independent sessions is often a difficult endeavor. To address these, and other concerns, various systems and methods described herein may enable monitoring of such "3G/4G handovers."

Figure 5:
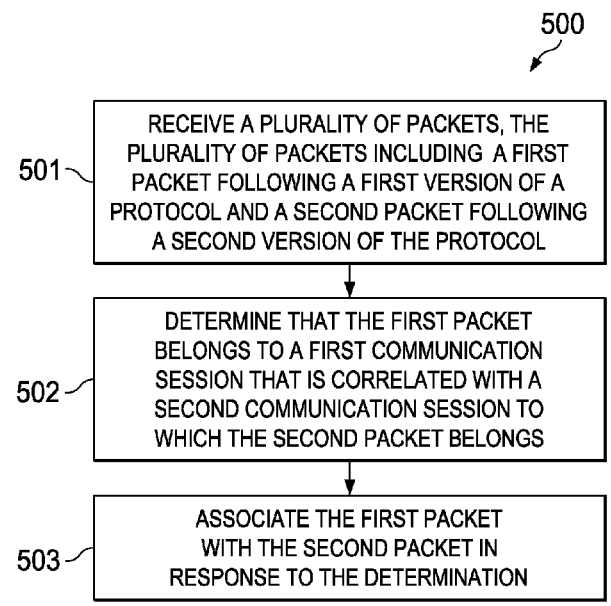
FIG. 5 is a flowchart of an example of method for monitoring 3G/4G handovers in telecommunication networks according to some embodiments.

FIG. 5 is a flowchart of a method of monitoring 3G/4G handovers in telecommunication networks. In some embodiments, method 500 may be performed, at least in part, by network monitoring system 103 of FIG. 1. As illustrated, at block 501, method 500 may include receiving a plurality of packets at network monitoring system 103, the plurality of packets including a first packet following a first version of a protocol and a second packet following a second version of the protocol. At block 502, method 500 may include determining, via network monitoring system 103, that the first packet belongs to a first communication session that is correlated with a second communication session to which the second packet belongs. Then, at block 502, method 500 may include using network monitoring system 103 to associate the first packet with the second packet in response to the determination.

In some implementations, the protocol may be a GTP protocol, the first packet may follow a GTPv1 protocol, and the second packet may follow a GTPv2 protocol. Session that move from GTPv1 to GTPv2 (i.e., 3G to 4G) or from GTPv2 to GTPv1 (i.e., 4G to 3G) may be correlated by front-end monitoring probe(s) 205 and/or analyzer device(s) 210 of FIG. 2, for example, based on uplink Tunnel Endpoint Identifiers (TEId) and IP address. Once identified as a version change, front end device(s) 205 may apply metadata to the version changing packet indicating the "Session Identifier" of the original session, and a flag indicating "Handover". Thereafter, in response to analyzer device(s) 210 receiving a "Handover" indication, analyzer device(s) 210 may use the "Session Identifier" to pull up the original session (i.e., the "old version"). Analyzer device(s) 210 may also copy relevant subscriber data into the new session (i.e., the "new version").

Figure 6:
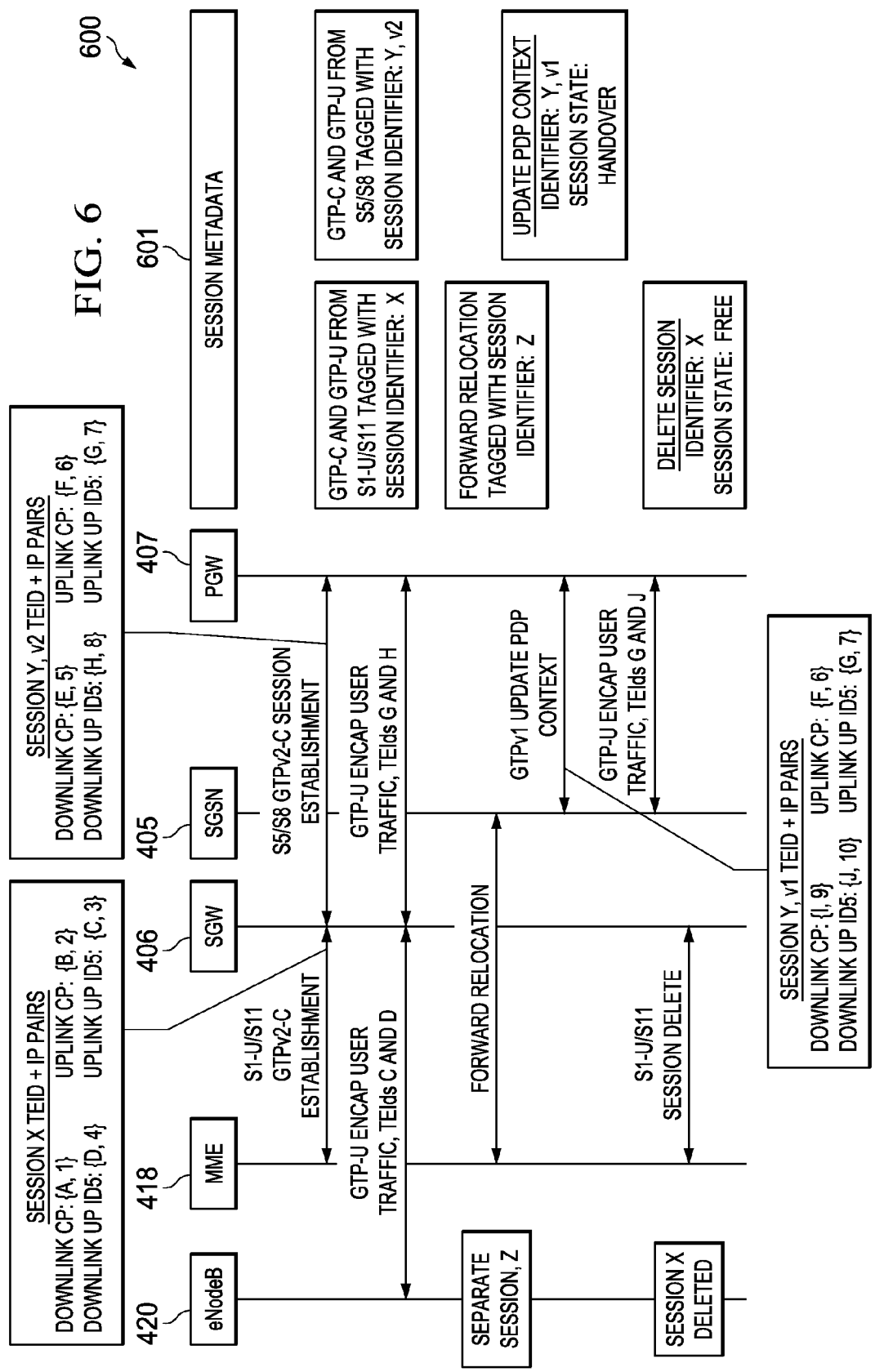
FIG. 6 is a call flow diagram of an example of method for performing 4G to 3G monitoring using S5/S8 interface(s) according to some embodiments.

FIG. 6 is a call flow diagram of an example of 4G to 3G monitoring using S5/S8 interface(s) according to some embodiments. In this scenario, network monitoring system 103 may be coupled to or otherwise configured to monitor the S1/S11 and S5/S8 interfaces. MME 418 may exchange GTPv2 establishment message(s) with SGW 406 over the S1/S11 interface(s), and SGW 406 may exchange GTPv2 session establishment message(s) with PGW 407 over the S5/S8 interface(s). In other words, GTPv2 Sessions "X" and "Y" on the S1/S11 and S5/S8 interfaces may be independently established.

In this example, TEId and IP pairs ({TEId, IP}) used in the S1/S11 interface(s) between MME 418 and SGW 406 may be as follows: Downlink Control Plane (CP): {A, 1}, Uplink CP: {B, 2}, Downlink User Plane (UP): {D, 4}, and Uplink UP: {C, 3}. Thus, network monitoring system 103 may store this data with session identifier "X" in session metadata 601. Also, TEId and IP pairs used in the S5/S8 interface(s) between SGW 406 and PGW 407 may be as follows: Downlink CP: {E, 5}, Uplink CP: {F, 6}, Downlink UP: {H, 8}, and Uplink UP: {G, 7}. Thus, network monitoring system 103 may store this data with session identifier "Y, v2" in session metadata 601. Then, TEId and IP pairs used in the Gn/Gp interface(s) between SGSN 405 and PGW 407 may be as follows: Downlink CP: {I, 9}, Uplink CP: {F, 6}, Downlink UP: {J, 10}, and Uplink UP: {G, 7}. Thus, network monitoring system 103 may store this data with session identifier "Y, v1" in session metadata 601.

GTP-U encapsulated user traffic with TEIds C and D may be exchanged between MME 418 and SGW 406, and GTP-U encapsulated user traffic with TEIds G and H may be exchanged between SGW 406 and PGW 407. Session "Z" represents a short-lived "Forward Relocation" session. A GTPv1 Update PDP Context transaction between SGSN 405 and PGW 407 on the S5/S8 interface(s) establishes a new GTPv1 session on both front-end monitoring probe(s) or device(s) 205 and analyzer device(s) 210, and that new session may be tagged with identifier "Y, v1." Then, front-end monitoring probe(s) 205 may detect that the new GTPv1 session ("Y, v1") matched a previously existing GTPv2 session ("Y, v2") and it may notify the analyzer device(s) 210. For example, front-end monitoring probe(s) 205 may determine that the Uplink CP TEId and IP address pair of the "Y, v2" session matches the Uplink CP TEId and IP address pair of the "Y, v1" session. Accordingly, analyzer device(s) 210 may migrate subscriber data between the two sessions. Session X may subsequently be deleted to free up resources or the like.

Figure 7:
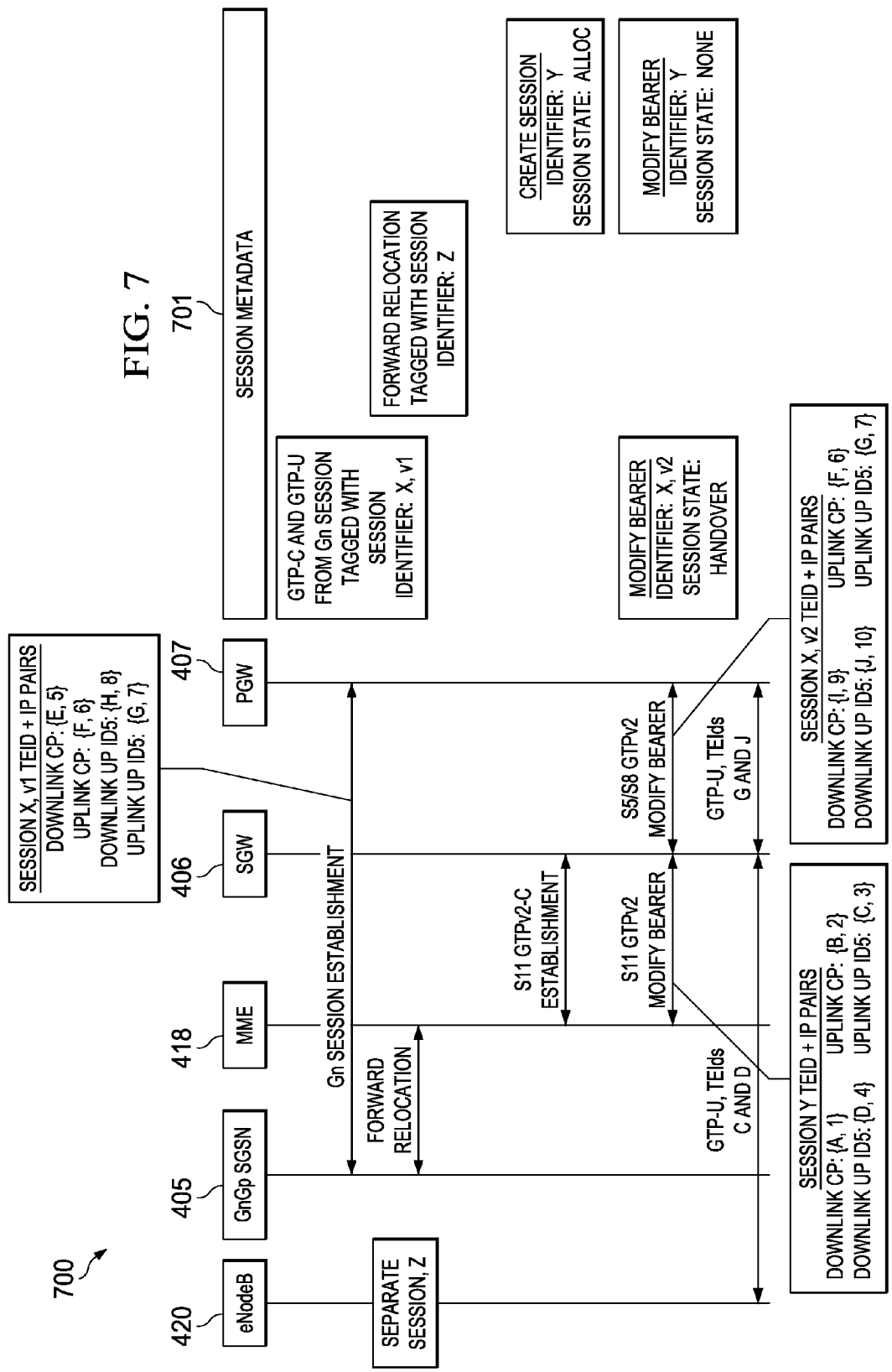
FIG. 7 is a call flow diagram of an example of method for performing 3G to 4G monitoring using S5/S8 interface(s) according to some embodiments.

FIG. 7 is a call flow diagram of an example of 3G to 4G monitoring using S5/S8 interface(s) according to some embodiments. In this scenario, network monitoring system 103 may be coupled to or otherwise configured to monitor the Gn/Gp and S5/S8 interfaces. First, SGSN 405 may exchange Gn establishment message(s) with PGW 407 over the Gn/Gp interface(s). Thus, a GTPv1 session "X, v1" on the Gn interface may be detected by front-end monitoring probe(s) 205 and/or analyzer device(s) 210. Session "Z" represents a short-lived Forward Relocation session. Session "Y" on the S4 interface may be established and detected by front-end monitoring probe(s) 205 and/or analyzer device(s) 210 independently of the previously existing Gn session (i.e., there is no correlation between the two at this point). Then, a GTPv2 Modify Bearer transaction may take place on the S11 interface between MME 418 and SGW 406. The Modify Bearer transaction on S5/S8 creates a new session (X,v2, in this example).

In this example, TEId and IP pairs ({TEId, IP}) used in the Gn/Gp interface(s) between SGSN 405 and PGW 407 may be as follows: Downlink Control Plane (CP): {E, 5}, Uplink CP: {F, 6}, Downlink User Plane (UP): {H, 8}, and Uplink UP: {G, 7}. Thus, network monitoring system 103 may store this data with session identifier "X, v1" in session metadata 701. Also, TEId and IP pairs used in the S4 interface between MME 418 and SGW 406 may be as follows: Downlink CP: {A, 1}, Uplink CP: {B, 2}, Downlink UP: {D, 4}, and Uplink UP: {C, 3}. Network monitoring system 103 may store this data with session identifier "Y" in session metadata 701. Then, TEId and IP pairs used in the S5/S8 interface(s) may be as follows: Downlink CP: {I, 9}, Uplink CP: {F, 6}, Downlink UP: {J, 10}, and Uplink UP: {G, 7}. Thus, network monitoring system 103 may store this data with session identifier "X, v2" in session metadata 701.

For instance, front-end monitoring probe(s) 205 may determine that the Uplink CP TEId and IP address pair of the "X, v2" session (i.e., the GTPv2 session) matches the Uplink CP TEId and IP address pair of the "X, v1" session (i.e., the GTPv1 session). Accordingly, analyzer device(s) 210 may migrate subscriber data between the two sessions. Session(s) may subsequently be deleted to free up resources or the like. Specifically, in this case, session X,v1 is freed while Session X,v2 continues.

Figure 8:
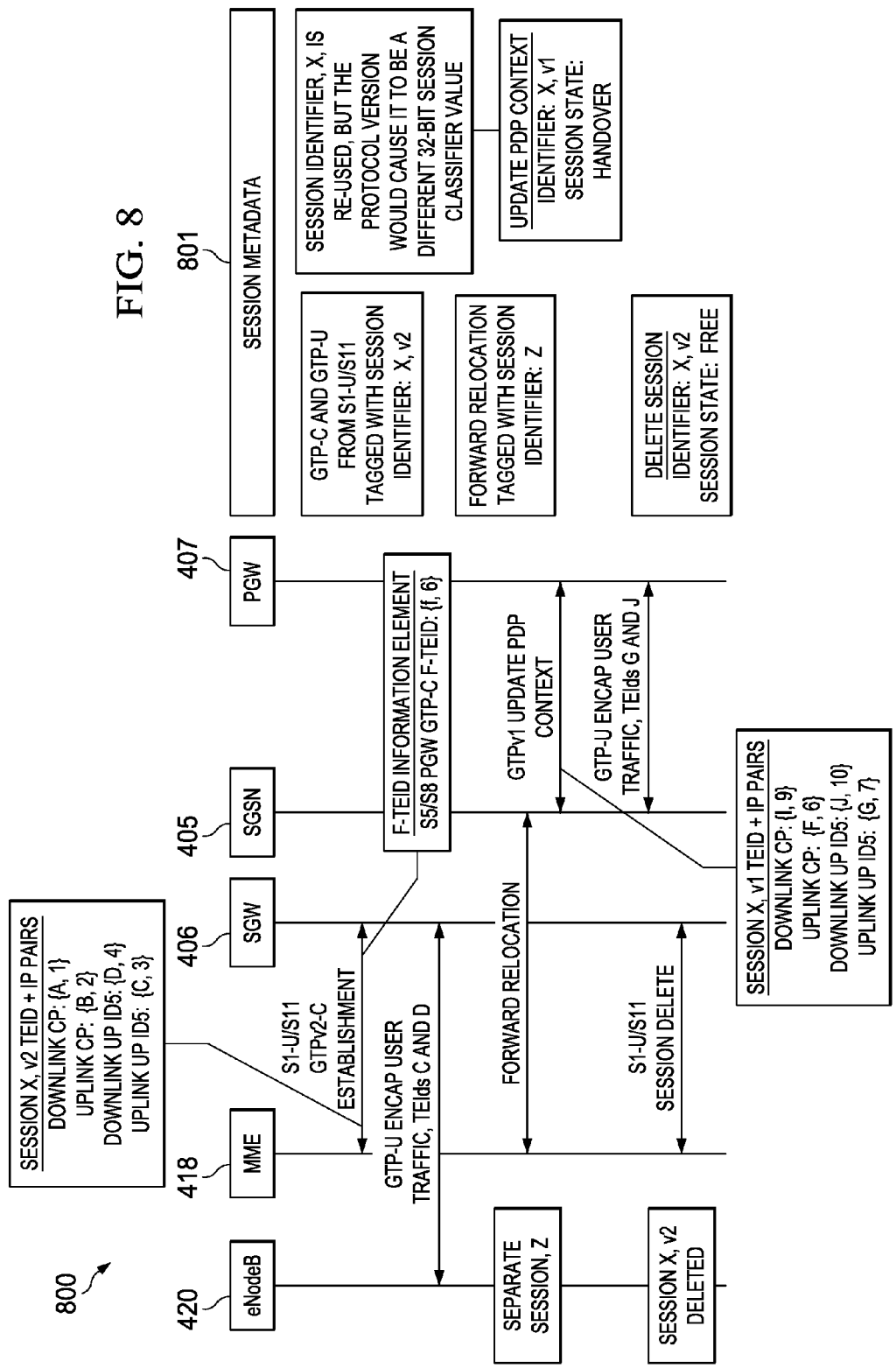
FIG. 8 is a call flow diagram of an example of method for performing 4G to 3G monitoring without using S5/S8 interface(s) according to some embodiments.

FIG. 8 is a call flow diagram of an example of 4G to 3G monitoring without using S5/S8 interface(s) according to some embodiments. For example, the S5/S8 interface may not be accessible to network monitoring system 103 (e.g., two or more of the elements shown in core 404 may be physically implemented in a same "box"). As illustrated, MME 418 may exchange GTPv2 session establishment message(s) with SGW 406 over the S1/S11 interface(s). Thus, a GTPv2 session "X, v2" may be detected by front-end monitoring probe(s) 205 and/or analyzer device(s) 210. Session "Z" represents a short-lived Forward Relocation session. Then, GTPv1 session "X, v1" may be detected by front-end monitoring probe(s) 205 and/or analyzer device(s) 210 independently of the previously existing session.

In this scenario, an additional level of correlation may be used to match the new GTPv1 session with the previous GTPv2 session. For example, the PGW 407 Fully-qualified TEId (F-TEId) information element of the GTPv2 Create Session transaction on the S1/S11 interface(s) may be used. PGW-F-TEID mapping entries with key TEID and IP address(es), and resulting session identifier may be created for each S11/S1-U Create Session transaction. In some cases, these mapping entries may be deleted by at least one of the following conditions: (a) an S5/S8 session establishment is identified which matches the entry; or (b) GTPv1 Update PDP Context transactions matching a GTPv2 session only through PGW F-TEID Mapping (i.e., not the usual header/F-TEID mapping) may be tagged by front-end monitoring probe(s) 205 with the matched GTPv2 session identifier value and a "Handover" indicator. Here it should be noted that deletion of Session X,v2 in a conventional manner would also delete the PGW F-TEID mapping entries for the session.

In the foregoing example, TEId and IP pairs ({TEId, IP}) used in the S1/S11 interface(s) between MME 418 and SGW 406 may be as follows: Downlink Control Plane (CP): {A, 1}, Uplink CP: {B, 2}, Downlink User Plane (UP): {D, 4}, and Uplink UP: {C, 3}. Thus, network monitoring system 103 may store this data with session identifier "X, v2" in session metadata 801. F-TEId information may include S5/S8 PGW GTP-C F-TEId: {F, 6}. Also, TEId and IP pairs used between SGSN 405 and PGW 407 may be as follows: Downlink CP: {I, 9}, Uplink CP: {F, 6}, Downlink UP: {J, 10}, and Uplink UP: {G, 7}. Thus, network monitoring system 103 may store this data with session identifier "X, v1" in session metadata 801. It should be noted that, although session identifier X is re-used, the protocol version may cause it to be a different 32-bit session classifier value than the "X" value used in the "X, v2" identifier.

When analyzer device(s) 210 receive a GTPv1 Update PDP Context tagged with a "Handover" indicator, they may look for a GTPv2 session with the same session identifier before allocating a new GTPv1 session. In the previous example, analyzer device(s) 210 may identify the correlation between the Uplink CP value (that is, {F, 6}) of session X,v1 and the S5/S8 PGW GTP-C F-TEId value (that is, also {F, 6}) of Session X,v2. Once found, analyzer device(s) 210 may then copy all subscriber data from the GTPv2 session into the new GTPv1 session.

Figure 9:
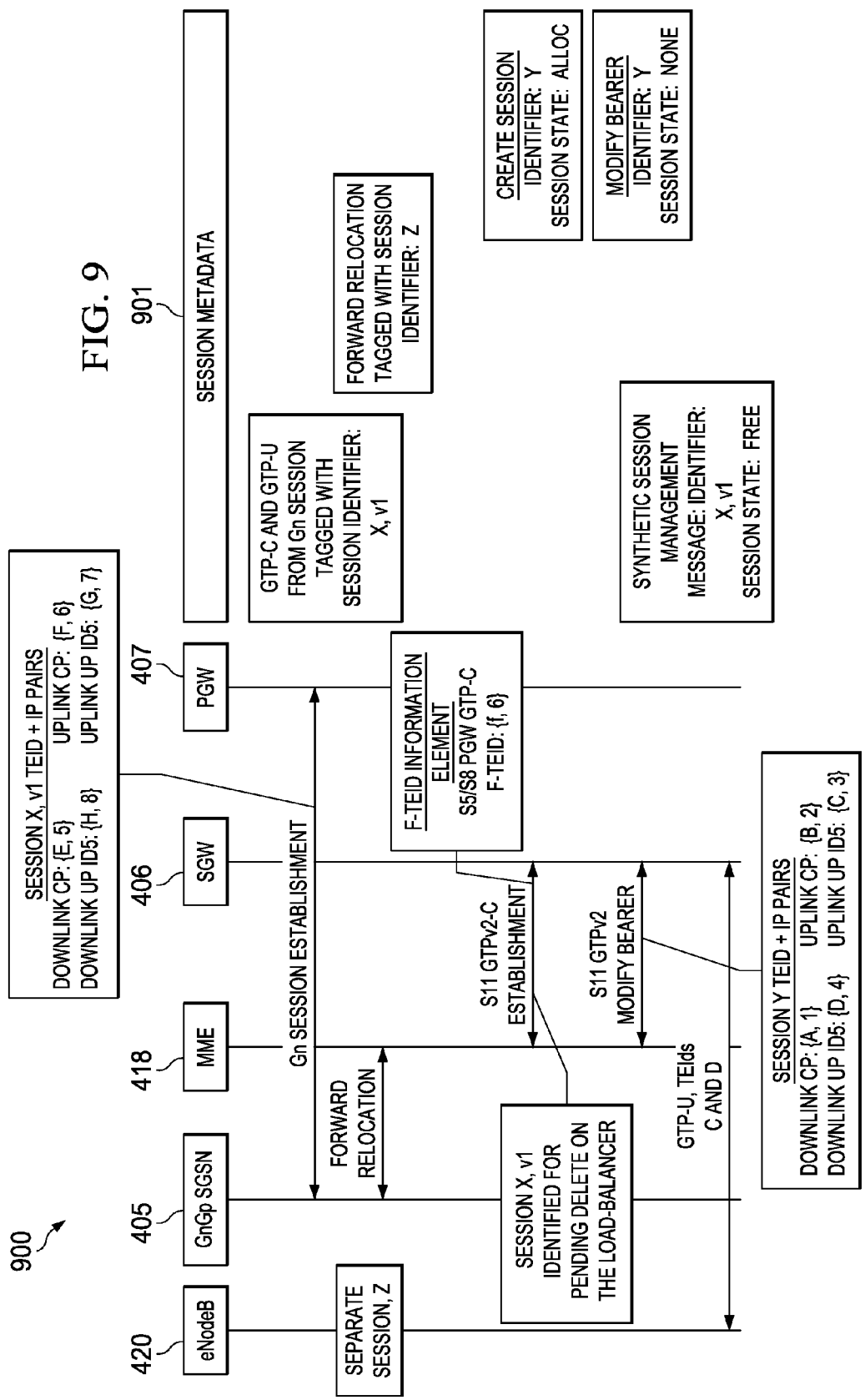
FIG. 9 is a call flow diagram of an example of method for performing 3G to 4G monitoring without using S5/S8 interface(s) according to some embodiments.

FIG. 9 is a call flow diagram of an example of 3G to 4G monitoring without using S5/S8 interface(s) according to some embodiments. Again, in this example, the S5/S8 interface may not be accessible to network monitoring system 103 (e.g., two or more of the elements shown in core 404 may be physically implemented in a same "box"). As illustrated, SGSN 405 may exchange GTPv2 session establishment message(s) with PGW 407 over the Gn/Gp interface(s). Thus, a GTPv1 session "X, v1" may be detected by front-end monitoring probe(s) 205 and/or analyzer device(s) 210. Session "Z" represents a short-lived Forward Relocation session. Then, GTPv2 session "Y" may be detected by front-end monitoring probe(s) 205 and/or analyzer device(s) 210 independently of the previously existing session. In this scenario, the PGW-F-TEID IE in the S11 GTPv2 establishment message(s) may be used to match the GTPv1 session over the Gn/Gp interface.

In this example, TEId and IP pairs ({TEId, IP}) used in the Gn/Gp interface(s) between SGSN 405 and PGW 407 may be as follows: Downlink Control Plane (CP): {E, 5}, Uplink CP: {F, 6}, Downlink User Plane (UP): {H, 8}, and Uplink UP: {G, 7}. Thus, network monitoring system 103 may store this data with session identifier "X, v1" in session metadata 901. F-TEId information may include S5/S8 PGW GTP-C F-TEId: {f, 6}. Also, TEId and IP pairs used between MME 418 and SGW 406 may be as follows: Downlink CP: {A, 1}, Uplink CP: {B, 2}, Downlink UP: {D, 4}, and Uplink UP: {C, 3}. Thus, network monitoring system 103 may store this data with session identifier "Y" in session metadata 901.

Accordingly, when front-end monitoring probe(s) 205 matches a GTPv2 Create Session transaction to a GTPv1 Gn session through the PGW-F-TEID mapping, it tags the outgoing packet with the matched GTPv1 session identifier and a "Handover" indicator. When analyzer device(s) 210 receive the GTPv2 Create Session with this indicator, they may again use the session identifier to locate the old GTPv1 Gn session and extract needed subscriber data.

Moreover, in cases where the S5/S8 interface is not present, the monitoring solution may not see any messaging to delete the old GTPv1 Gn session. To account for this, after matching the S11 GTPv2 Create Session transaction, front-end monitoring probe(s) 205 may flag the matching Gn session for pending delete and wait a defined period of time before executing the delete. When this time is exceeded, front-end monitoring probe(s) 205 may notify analyzer device(s) 210 that the GTPv1 Gn session is deleted, thus allowing analyzer device(s) 210 to also free up resources for this session. As previously noted, however, in cases where the S5/S8 interface is available for monitoring (e.g., shown in FIGS. 6 and 7), a GTPv2 S5/S8 Modify Bearer transaction may match the GTPv1 Gn session.

It should be understood that the various operations described herein, particularly in connection with FIGS. 5-9, may be implemented in software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Aspects of network monitoring system 103 may be implemented or executed by one or more computer systems. One such computer system is illustrated in FIG. 10. In various embodiments, computer system 1000 may be a server, a mainframe computer system, a workstation, a network computer, a desktop computer, a laptop, or the like. For example, in some cases, front-end monitoring probe 205 shown in FIG. 2 may be implemented as computer system 1000. Moreover, one or more of analyzer devices 210 and/or intelligence engine may include one or more computers in the form of computer system 1000. As explained above, in different embodiments these various computer systems may be configured to communicate with each other in any suitable way, such as, for example, via network 100.

As illustrated, computer system 1000 includes one or more processors 1010A-N coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, a given entity (e.g., network monitoring system 103) may be implemented using a single instance of computer system 1000, while in other embodiments multiple such systems, or multiple nodes making up computer system 1000, may be configured to host different portions or instances of embodiments. For example, in an embodiment some elements may be implemented via one or more nodes of computer system 1000 that are distinct from those nodes implementing other elements (e.g., a first computer system may implement classification engine 310 while another computer system may implement routing/distribution control module 330).

In various embodiments, computer system 1000 may be a single-processor system including one processor 1010A, or a multi-processor system including two or more processors 1010A-N (e.g., two, four, eight, or another suitable number). Processor(s) 1010A-N may be any processor capable of executing program instructions. For example, in various embodiments, processor(s) 1010A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 1010A-N may commonly, but not necessarily, implement the same ISA. Also, in some embodiments, at least one processor(s) 1010A-N may be a graphics processing unit (GPU) or other dedicated graphics-rendering device.

System memory 1020 may be configured to store program instructions and/or data accessible by processor(s) 1010A-N. In various embodiments, system memory 1020 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include any tangible, non-transitory storage media or memory media such as magnetic or optical media—e.g., disk or CD/DVD-ROM coupled to computer system 1000 via I/O interface 1030.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor(s) 1010A-N). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor(s) 1010A-N.

Network interface 1040 may be configured to allow data to be exchanged between computer system 1000 and other devices attached to network 115, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touch screens, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement certain embodiments described herein, and data storage 1035, comprising various data accessible by program instructions 1025. In an embodiment, program instructions 1025 may include software elements of embodiments illustrated in FIG. 2. For example, program instructions 1025 may be implemented in various embodiments using any desired programming language, scripting language, or combination of programming languages and/or scripting languages (e.g., C, C++, C#, JAVA®, JAVASCRIPT®, PERL®, etc.). Data storage 1035 may include data that may be used in these embodiments. In other embodiments, other or different software elements and data may be included.

A person of ordinary skill in the art will appreciate that computer system 1000 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
   receiving a plurality of packets at a telecommunications monitoring system, the plurality of packets including a first packet following a first version of a protocol and a second packet following a second version of the protocol, wherein the protocol is a General Packet Radio Service (GPRS) Tunneling Protocol (GTP), wherein the first packet follows a GTPv1 protocol and the second packet follows a GTPv2 protocol and wherein the second packet is received after the first packet in connection with a 3G-to-4G handover;
   determining, via the telecommunications monitoring system, that the first packet belongs to a first communication session that is correlated with a second communication session to which the second packet belongs;
   using the telecommunications monitoring system to associate the first packet with the second packet in response to the determination; and
   matching uplink control plane (CP) and user plane (UP) information for the first packet obtained from a Gn interface against uplink CP and UP information for the second packet obtained from an S5 or S8 interface.

2. The method of claim 1, wherein the uplink CP information is a first Tunnel Endpoint Identifier (TEId) and Internet Protocol (IP) address combination, and wherein the uplink UP information is a second TEId and IP address combination different from the first combination.

3. The method of claim 1, wherein matching uplink CP and UP information comprises matching uplink CP information for the first packet obtained from a Gn interface against Fully Qualified Tunnel Endpoint Identifier (F-TEId) information for the second packet obtained from an S11 interface.

4. The method of claim 1, wherein the first packet is received after the second packet in connection with a 4G-to-3G handover and wherein matching uplink CP and UP information comprises matching uplink CP and UP information for the second packet obtained from an S5 or S8 interface against uplink CP and UP information for the first packet obtained from a Gn interface.

5. The method of claim 4, wherein the uplink CP information is a first Tunnel Endpoint Identifier (TEId) and Internet Protocol (IP) address combination, and wherein the uplink UP information is a second TEId and IP address combination different from the first combination.

6. The method of claim 4, further comprising:
   matching Fully Qualified Tunnel Endpoint Identifier (F-TEId) information for the second packet obtained from an S5 or S8 interface against uplink CP information for the first packet obtained from a Gn interface.

7. A telecommunications monitoring system, comprising:
   a processor; and
   a memory coupled to the processor, the memory configured to store program instructions executable by the processor to cause the telecommunications monitoring system to:
      receive a plurality of packets, the plurality of packets including a first packet following a first version of a protocol and a second packet following a second version of the protocol, wherein the protocol is a General Packet Radio Service (GPRS) Tunneling Protocol (GTP), wherein the first packet follows a GTPv1 protocol and the second packet follows a GTPv2 protocol and wherein the second packet is received after the first packet in connection with a 3G-to-4G handover;
      determine that the first packet belongs to a first communication session that is correlated with a second communication session to which the second packet belongs;
      associate the first packet with the second packet in response to the determination; and
      match uplink control plane (CP) and user plane (UP) information for the first packet obtained from a Gn interface against uplink CP and UP information for the second packet obtained from an S5 or S8 interface.

8. The telecommunications monitoring system of claim 7, wherein the uplink CP information is a first Tunnel Endpoint Identifier (TEId) and Internet Protocol (IP) address combination, and wherein the uplink UP information is a second TEId and IP address combination different from the first combination.

9. The telecommunications monitoring system of claim 7, wherein the second packet is received after the first packet in connection with a 3G-to-4G handover, and wherein the program instructions are further executable by the processor to cause the telecommunications monitoring system to match uplink CP information for the first packet obtained from a Gn interface against Fully Qualified Tunnel Endpoint Identifier (F-TEId) information for the second packet obtained from an S11 interface.

10. The telecommunications monitoring system of claim 7, wherein the first packet is received after the second packet in connection with a 4G-to-3G handover, wherein the program instructions are further executable by the processor to cause the telecommunications monitoring system to match uplink control plane (CP) and user plane (UP) information for the second packet obtained from an S5 or S8 interface against uplink CP and UP information for the first packet obtained from a Gn interface, wherein the uplink CP information is a first Tunnel Endpoint Identifier (TEId) and Internet Protocol (IP) address combination, and wherein the uplink UP information is a second TEId and IP address combination different from the first combination.

11. The telecommunications monitoring system of claim 7, wherein the first packet is received after the second packet in connection with a 4G-to-3G handover, and wherein the program instructions are further executable by the processor to cause the telecommunications monitoring system to match Fully Qualified Tunnel Endpoint Identifier (F-TEId) information for the second packet obtained from an S5 or S8 interface against uplink CP information for the first packet obtained from a Gn interface.

12. A non-transitory computer-readable storage medium having program instructions stored thereon that, upon execution by a processor within a computer system, cause the computer system to:
receive a plurality of packets, the plurality of packets including a first packet following a first version of a protocol and a second packet following a second version of the protocol, wherein the protocol is a General Packet Radio Service (GPRS) Tunneling Protocol (GTP), wherein the first packet follows a GTPv1 protocol and the second packet follows a GTPv2 protocol and wherein the second packet is received after the first packet in connection with a 3G-to-4G handover;
determine that the first packet belongs to a first communication session that is correlated with a second communication session to which the second packet belongs;
associate the first packet with the second packet in response to the determination; and
match uplink control plane (CP) and user plane (UP) information for the first packet obtained from a Gn interface against uplink CP and UP information for the second packet obtained from an S5 or S8 interface.

13. The non-transitory computer-readable storage medium of claim 12,
wherein the uplink CP information is a first Tunnel Endpoint Identifier (TEId) and Internet Protocol (IP) address combination, and wherein the uplink UP information is a second TEId and IP address combination different from the first combination.

14. The non-transitory computer-readable storage medium of claim 12, wherein the first packet is received after the second packet in connection with a 4G-to-3G handover, and wherein the program instructions to match uplink CP and UP information are further executable by the processor to cause the telecommunications monitoring system to:
match uplink CP and UP information for the second packet obtained from an S5 or S8 interface against uplink CP and UP information for the first packet obtained from a Gn interface, wherein the uplink CP information is a first Tunnel Endpoint Identifier (TEId) and Internet Protocol (IP) address combination, and wherein the uplink UP information is a second TEId and IP address combination different from the first combination; or
match Fully Qualified Tunnel Endpoint Identifier (F-TEId) information for the second packet obtained from an S5 or S8 interface against uplink CP information for the first packet obtained from a Gn interface.

\* \* \* \* \*